(12) United States Patent
Even et al.

(10) Patent No.: US 8,664,544 B2
(45) Date of Patent: Mar. 4, 2014

(54) ATTACHMENT SYSTEM FOR CABLES, IN PARTICULAR FOR WIND TURBINES

(75) Inventors: Rainer Even, Saarbrücken (DE); Burhan Yagci, Sulzbach (DE)

(73) Assignee: Hydac Accessories GmbH, Sulzback/Saar (DE)

( * ) Notice: Subject to any disclaimer, the term of this patent is extended or adjusted under 35 U.S.C. 154(b) by 479 days.

(21) Appl. No.: 12/805,680

(22) Filed: Aug. 12, 2010

(65) Prior Publication Data

US 2012/0024595 A1 Feb. 2, 2012

(30) Foreign Application Priority Data

Jul. 29, 2010 (DE) .......................... 10 2010 032 686
Jul. 29, 2010 (DE) .......................... 10 2010 032 687

(51) Int. Cl.
*H02G 3/18* (2006.01)
*F16L 3/22* (2006.01)

(52) U.S. Cl.
USPC ........... 174/665; 174/650; 174/144; 174/503; 174/68.1; 174/72 A; 248/68.1; 248/56; 248/635

(58) Field of Classification Search
USPC ....... 174/655, 503, 251, 111, 146, 144, 65 G, 174/11 BH, 559, 68.1, 72 A; 248/68.1, 62, 248/74.1, 56, 57, 604, 608, 635, 628
See application file for complete search history.

(56) References Cited

U.S. PATENT DOCUMENTS

| 277,374 | A | * | 5/1883 | Strohm ......................... 174/111 |
| 289,164 | A | * | 11/1883 | Strohm ......................... 174/111 |
| 1,851,939 | A | * | 3/1932 | Williams ........................ 138/89 |
| 2,902,821 | A | * | 9/1959 | Kelly, Jr. ........................ 59/80 |
| 3,054,587 | A | | 9/1962 | Hebenstreit et al. |
| 3,092,360 | A | * | 6/1963 | Cook et al. ...................... 248/56 |
| 3,739,077 | A | * | 6/1973 | Winkelman ................ 174/149 R |
| 3,894,706 | A | * | 7/1975 | Mizusawa ..................... 248/68.1 |
| 4,542,877 | A | * | 9/1985 | Elsasser ......................... 248/561 |
| 4,638,469 | A | * | 1/1987 | Bryant et al. ................... 367/154 |
| 4,665,755 | A | * | 5/1987 | Stalder ......................... 73/862.01 |
| 4,707,891 | A | * | 11/1987 | Chidester ....................... 24/136 R |
| 4,715,571 | A | * | 12/1987 | Soltow et al. ................. 248/68.1 |
| 4,804,020 | A | * | 2/1989 | Bartholomew ............... 138/111 |

(Continued)

FOREIGN PATENT DOCUMENTS

DE   77 09 148 U1   7/1977
EP   0 681 133 A2   11/1995

(Continued)

*Primary Examiner* — Adrian S Wilson
*Assistant Examiner* — Abhishek Rathod
(74) *Attorney, Agent, or Firm* — Roylance, Abrams, Berdo and Goodman LLP

(57) ABSTRACT

An attachment system for cables (7), in particular for wind turbines, has a base body (1, 3) securable to a support structure and forming cable bushings (5) with openings for cables (7). The openings can be closed by a cover (17) applying retaining forces to the cables (7). The cable bushings (5) on the base body (1, 3) are arranged at least over part of a ring, with an outside opening. The cover (17) has retaining bodies lockable to the base body (1, 3) for preliminary fixing of the cables (7) inserted into the cable bushings (5) and a tightening strap (17) encompassing the base body (1, 3) and applying retaining forces to the cables (7) via the retaining bodies.

15 Claims, 7 Drawing Sheets

(56) References Cited

U.S. PATENT DOCUMENTS

| | | | | |
|---|---|---|---|---|
| 5,027,478 | A * | 7/1991 | Suhr | 24/16 R |
| 5,243,138 | A * | 9/1993 | Guthke et al. | 174/146 |
| 5,257,768 | A * | 11/1993 | Juenemann et al. | 248/604 |
| 6,011,218 | A * | 1/2000 | Burek et al. | 174/40 CC |
| 6,375,017 | B1 * | 4/2002 | Schattner et al. | 211/85.13 |
| 6,561,466 | B1 * | 5/2003 | Myers et al. | 248/74.4 |
| 6,598,835 | B2 * | 7/2003 | Minnick | 248/56 |
| 6,655,642 | B1 * | 12/2003 | Zearbaugh | 248/65 |
| 6,710,249 | B1 * | 3/2004 | Denton | 174/651 |
| 7,377,472 | B2 * | 5/2008 | Brown et al. | 248/74.1 |
| 7,806,629 | B2 * | 10/2010 | McCoy | 405/184.4 |
| 2002/0000026 | A1 * | 1/2002 | Noda | 24/458 |
| 2004/0262462 | A1 * | 12/2004 | Polak et al. | 248/74.1 |
| 2006/0090969 | A1 * | 5/2006 | Eckenstein et al. | 188/65.1 |
| 2007/0007397 | A1 * | 1/2007 | Nelson | 248/68.1 |
| 2007/0120023 | A1 * | 5/2007 | Martinez et al. | 248/75 |
| 2007/0278357 | A1 * | 12/2007 | Pizzi | 248/74.1 |
| 2011/0042529 | A1 * | 2/2011 | Walter | 248/68.1 |
| 2012/0028511 | A1 * | 2/2012 | Even et al. | 439/796 |

FOREIGN PATENT DOCUMENTS

| | | |
|---|---|---|
| EP | 1 059 477 A2 | 12/2000 |
| GB | 2 466 919 A | 7/2010 |
| WO | WO 00/79660 A1 | 12/2000 |

* cited by examiner

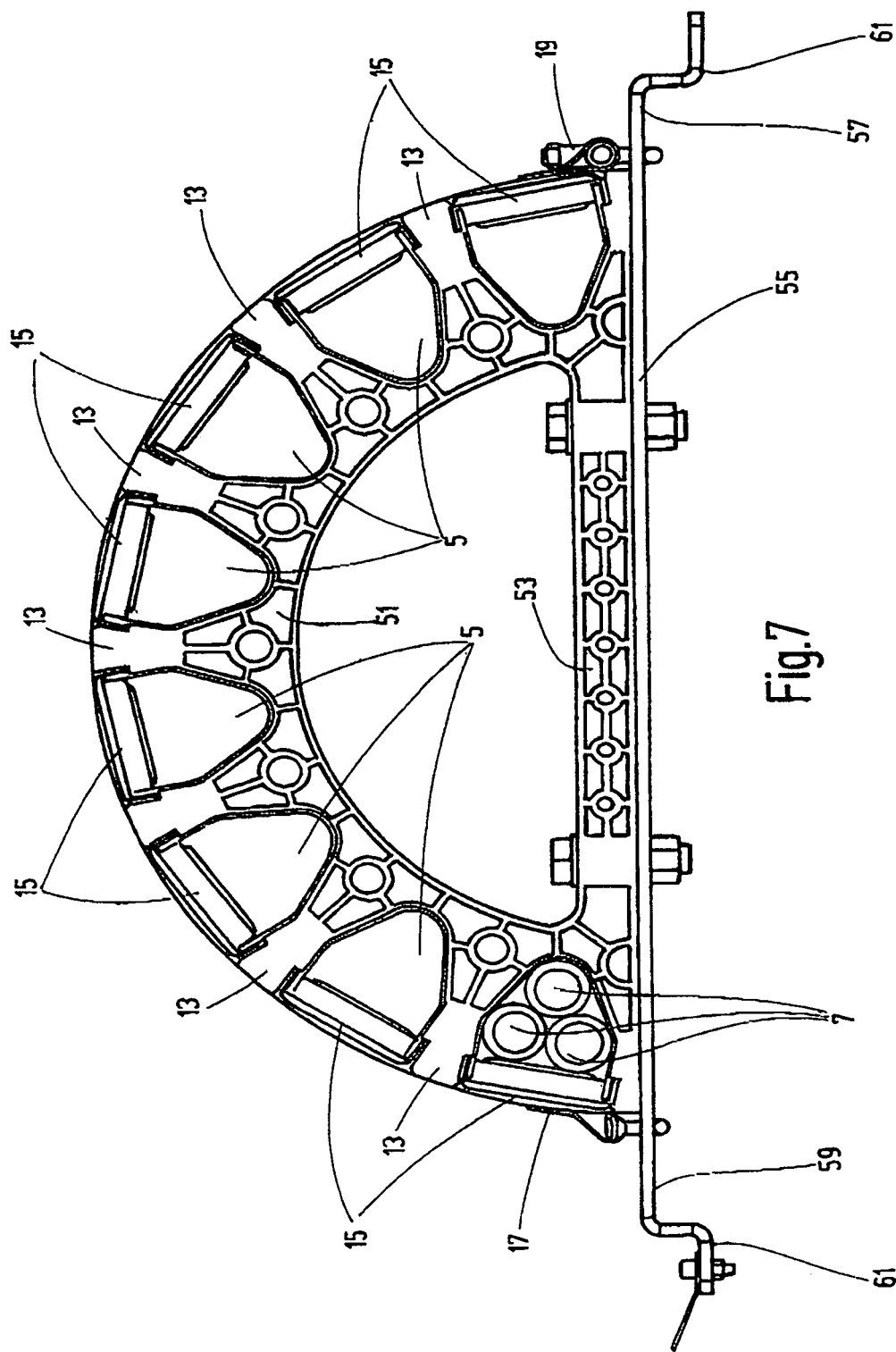

ATTACHMENT SYSTEM FOR CABLES, IN PARTICULAR FOR WIND TURBINES

FIELD OF THE INVENTION

The invention relates to an attachment system for cables, in particular for wind turbines, having a base body securable to a support structure and forming cable bushings. Each cable bushing has an opening for the insertion of cables that can be closed by a cover applying a retaining force to the cables.

BACKGROUND OF THE INVENTION

To deliver the energy produced in wind turbines and for other operating purposes, such as control, monitoring and the like, cables leading through the tower into the nacelle can be reliably secured to the corresponding support structures, especially the tower segments. Usually, attachments with clamp-like base bodies are used for this purpose, in which the cables inserted into them can be secured. These attachment systems in which a corresponding number of screwing processes must be carried out require high mounting effort. This requirement applies especially to the attachment of cables routed from below through the tower to the nacelle and connected to the generator unit. In conventional wind turbines, this generator unit together with the nacelle can execute up to three revolutions before the nacelle is set back. So that the cables can also execute the motion, they are routed over a cable loop hanging into the tower. To prevent the cables from chafing one another during rotary motion, the cables must be kept at a distance from each other. For this purpose, the cables are conventionally held by a round support structure, for example, in the form of a pipe section around which the cables are distributed and attached thereto with simple clamps. This type of installation takes place at a considerable height and is very complex.

SUMMARY OF THE INVENTION

An object of the invention is to provide an improved attachment system especially suited to use with cables for wind turbines.

According to the invention, this object is basically achieved by an attachment system forming a cable loop hanging from the nacelle into the tower by cable bushings on a base body located in an arrangement extending over at least one part of a ring, with openings situated on its outside. Retaining bodies as a component of the cover can be locked to the base body for preliminary fixing of the cables inserted into the cable bushings. The cables can be easily inserted in succession into the cable bushings since they are protected against falling out. Since the cover has a tightening strap applying the retaining force to the cables via the retaining bodies, only a single screw connection process for tensioning the tightening strap is necessary to secure all the cables held in the ring arrangement.

As one preferred embodiment, the base body can have the shape of a circular ring body with an inner ring attached to a preferably round support part and an outer ring surrounding the inner ring at a distance and forming the cable bushings. The cables fixed thereto thus form a cable ring with a corresponding radial distance to the support part so that a cable group of relatively large diameter with a correspondingly large number of individual cables can be formed.

For attachment of the base body to a flat support structure, the base body can have a ring part forming the cable bushings and extending over part of a circular line. The partial circular line ends are connected by a crosspiece integral with it in the form of a straight beam connected to the support part in the form of a bracket whose ends project over the respective ends of the beam. The ends of the tightening strap are anchored to the projecting ends.

While the ring body or the ring part preferably form a full circle or a partial circle, a non-round, for example, polygonal, ring shape is possible.

In especially advantageous exemplary embodiments, the base body can have cable bushings in the form of tub-like trough-shaped bodies connected to one another by wall parts extending in the peripheral direction. In such configuration, the retaining bodies can have a clamping part projecting into the opening of the trough-shaped bodies in the operating position and forming a contact surface applying the retaining force to the respective cables.

The arrangement can be especially advantageously made such that the cover surface of the retaining bodies opposite the contact surface as the bearing surface of the tightening strap has an arch matched to the peripheral circular line of the outer ring. The cover surface of the retaining bodies shaped in this way forms not only protection against the tightening strap, but also forms a part of an imaginary peripheral cylindrical surface of the outer ring for optimum flat contact of the tightening strap.

With respect to the configuration of the outer ring, advantageously the outer ring between the trough-shaped bodies has two wall parts, each of which delimits the axial outer sides of the outer ring and in which on both sides of the trough-shaped bodies, recesses are radially open to the outside. Catches are made in the wall parts so that the retaining bodies can be protected against motion directed radially to the outside with catch projections provided on the parts of the retaining bodies overlapping the trough-shaped bodies. Advantageously, in this exemplary embodiment, the wall parts on both sides of the contact surface located on the cover surface of the retaining bodies can form guide surfaces for lateral guidance of the tightening strap.

In other advantageous exemplary embodiments, the trough-shaped bodies on their outer sides can be overlapped by parts of the retaining bodies and have projections made such that the retaining bodies with the catch projections located thereon can be secured against motion directed radially to the outside.

In such exemplary embodiments, the cover surface of the retaining parts can have radially protruding guide projections forming guide surfaces for lateral guidance of the tightening strap.

The retaining bodies can be made as one-piece injection moldings, but can alternatively be formed from two identically made parts connected to one another. Each part has protruding guide projections as guide surfaces for each side of the tightening.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure:

FIG. 7 is a side elevational view of an attachment system according to a third exemplary embodiment of the invention;

DETAILED DESCRIPTION OF THE INVENTION

Figure 1:
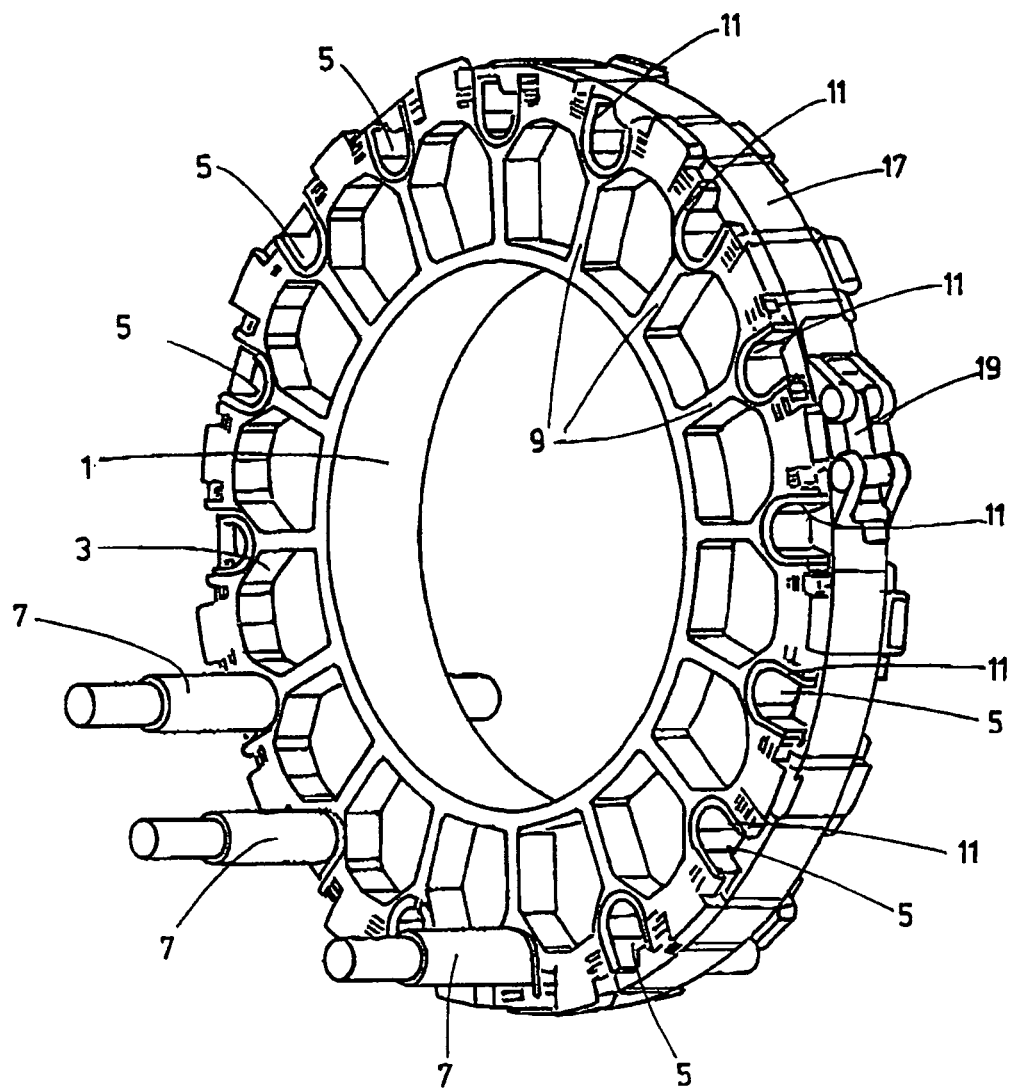
FIG. 1 is a perspective view of an attachment system according to a first exemplary embodiment of the invention, the attachment of only three cables being indicated by way of example.

FIG. 1 shows a first exemplary embodiment of the invention in its entirety. A base body is in the form of a circular ring body with an inner ring 1 and an outer ring 3. Distributed around the entire periphery of the outer ring 3, there is a series of cable bushings 5, not all numbered in FIG. 1. In FIG. 1, for example, cables 7 are inserted into only three of the cable bushings 5.

The other cable bushings 5 are shown without the cables inserted for the sake of clarity of the drawings. The inner ring 1 and outer ring 3 are kept at a distance from one another by radially extending braces 9 (only some of which are numbered in FIG. 1). The attachment star formed of the inner ring 1 and outer ring 3 is made as a one-piece injection molding. Details of the configuration of the cable bushings 5 and of the cover interacting with the cable bushings 5 on their openings are shown in FIGS. 2 and 4.

Figure 2:
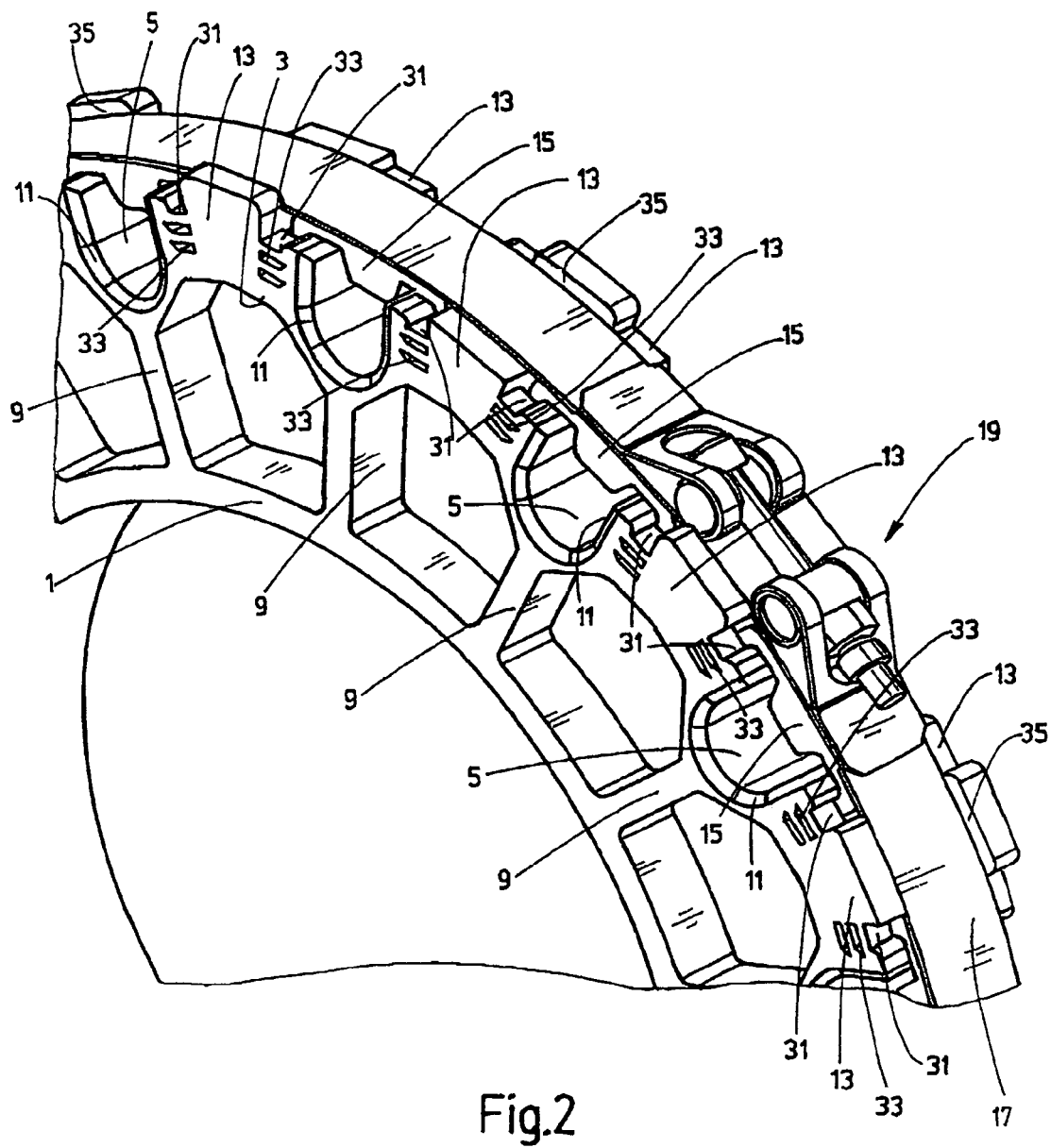
FIG. 2 is an enlarged partial perspective view of only one peripheral segment of the attachment system of FIG. 1.

As FIG. 2 shows, the cable bushings 5 are formed by trough-shaped bodies 11 (not all numbered in FIG. 1) in the form of troughs which are radially open to the outside and which are connected to one another by wall parts 13. Wall parts 13 form the axially outside boundary of the outer ring 3. The cover for the cable bushings 5 has one retaining body 15 for each cable bushing 5 and a single tightening strap or member 17 provided for all cable bushings 5. Strap 17 extends over the entire outer periphery of the outer ring 3 and, as is conventional for tightening straps, can be tightened by a tensioner 19 actuatable by a clamping screw.

Figure 4:
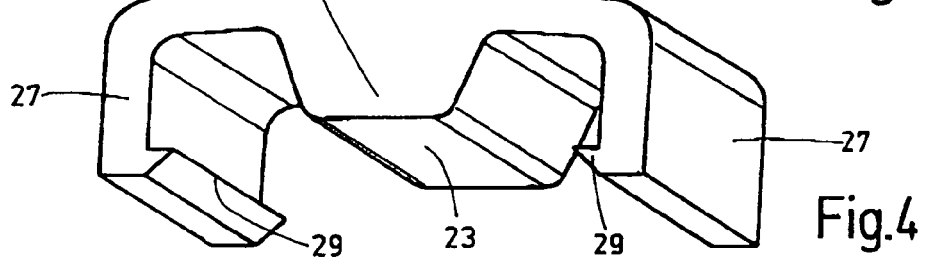
FIG. 4 is an enlarged perspective view of only one retaining body as a component of the attachment system according to first exemplary embodiment of FIGS. 1 and 2.

FIG. 4 separately shows one of the retaining bodies 15 for the first exemplary embodiment in the form of a one-piece injection molding with a central clamping part 21. When the retaining body 15 has been moved into the operating position for preliminary fixing of the cable 7 inserted into the pertinent cable bushing 5, retaining body 15 engages the pertinent cable bushing 5 with one contact surface 23 adjoining the pertinent cable 7. The top of the retaining bodies 15 opposite the contact surface 23 forms an arched cover surface 25 for contact with the tightening strap 17, the arch being matched to the peripheral round shape of the outer ring 3. Laterally from the clamping part 21, fixing parts 27 are angled relative to the cover surface 25 and have free ends with catch projections 29 facing one another.

In the wall parts 13 extending between the trough-shaped bodies 11 on both sides of the trough-shaped bodies 11, recesses 31 are open radially to the outside. When the retaining bodies 15 are attached, their fixing parts 27 engage the wall part 13. In the recesses 31, catches 33 are provided to engage the catch projections 29 of the retaining bodies 15 to lock that motion directed radially to the outside, as a tensioning motion for transfer of the retaining force from the contact surface 23 to the pertinent cable 7. The retaining bodies are protected against falling out of the cable bushings 5 before the tightening strap 17 is applied. The pertinent cables 7 are therefore fixed beforehand. As the lateral guide for the tightening strap 17, the wall parts 13 extending between the trough-shaped bodies 11 on the inside form guide surfaces 35 for lateral guidance of the tightening strap 17.

Figure 3:
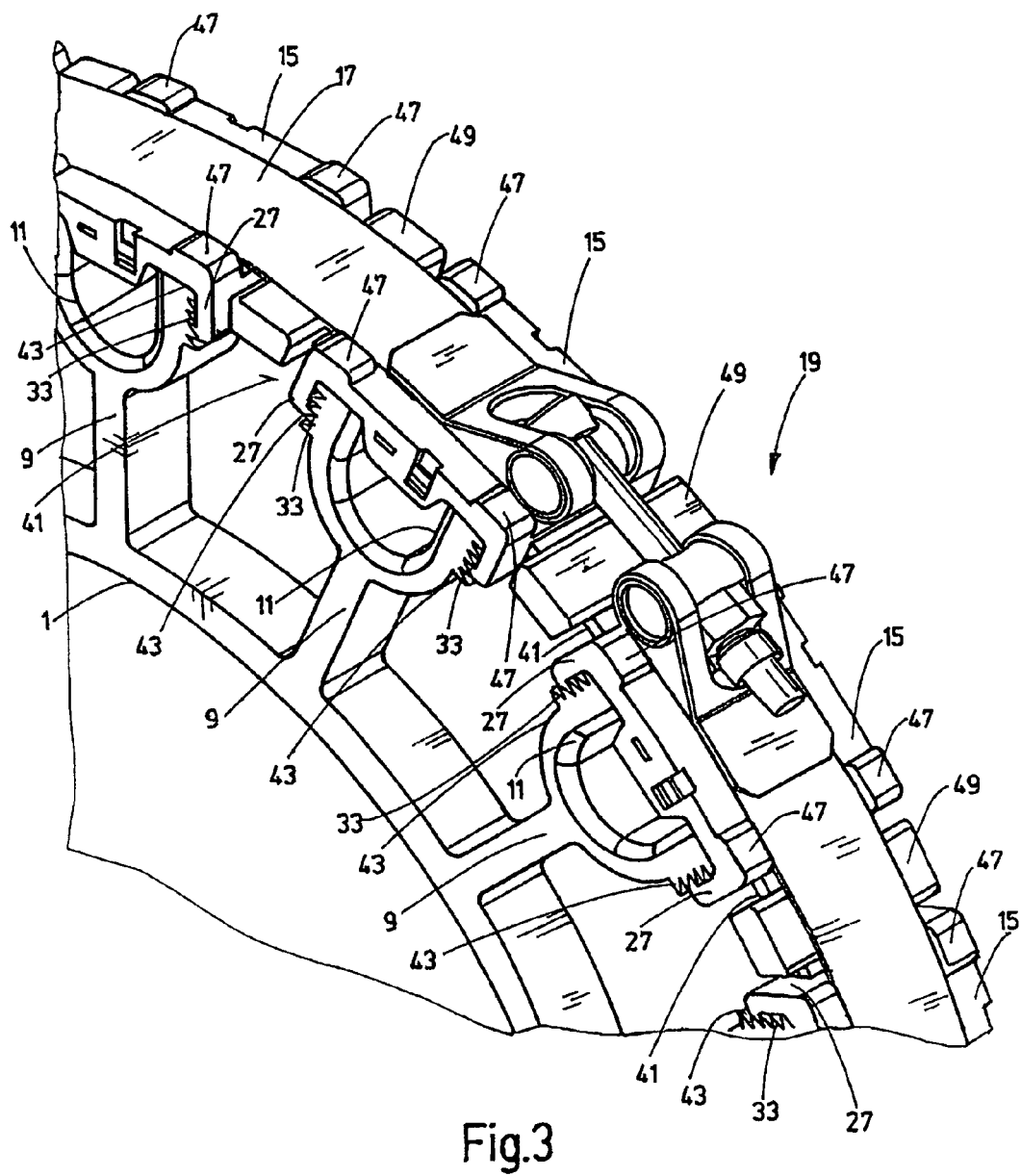
FIG. 3 is an enlarged, partial perspective view according to a second exemplary embodiment of the invention.
Figure 6:
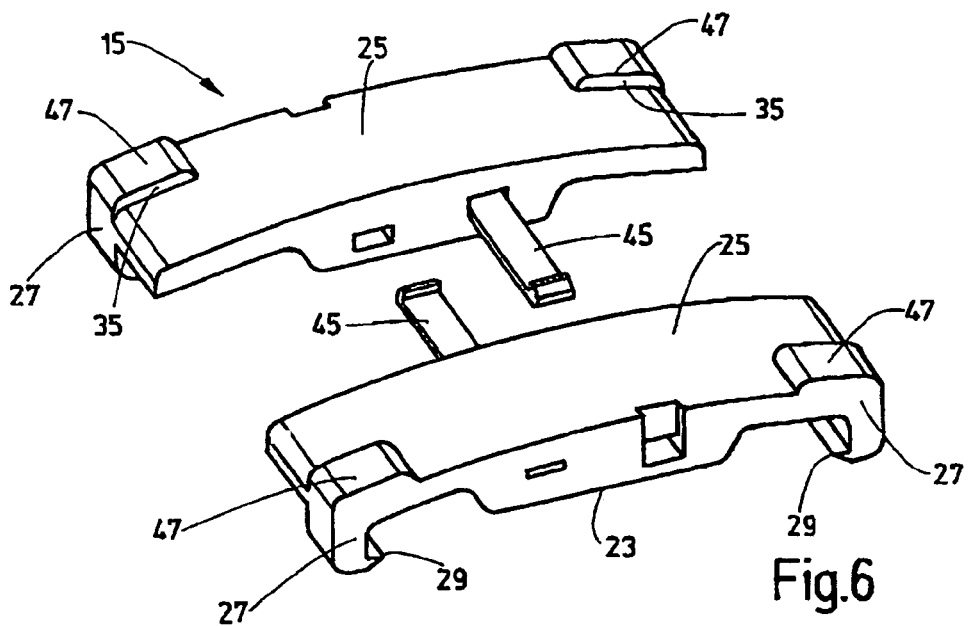
FIG. 6 is a perspective view showing the retaining body from FIG. 5 in the exploded state.
Figure 5:
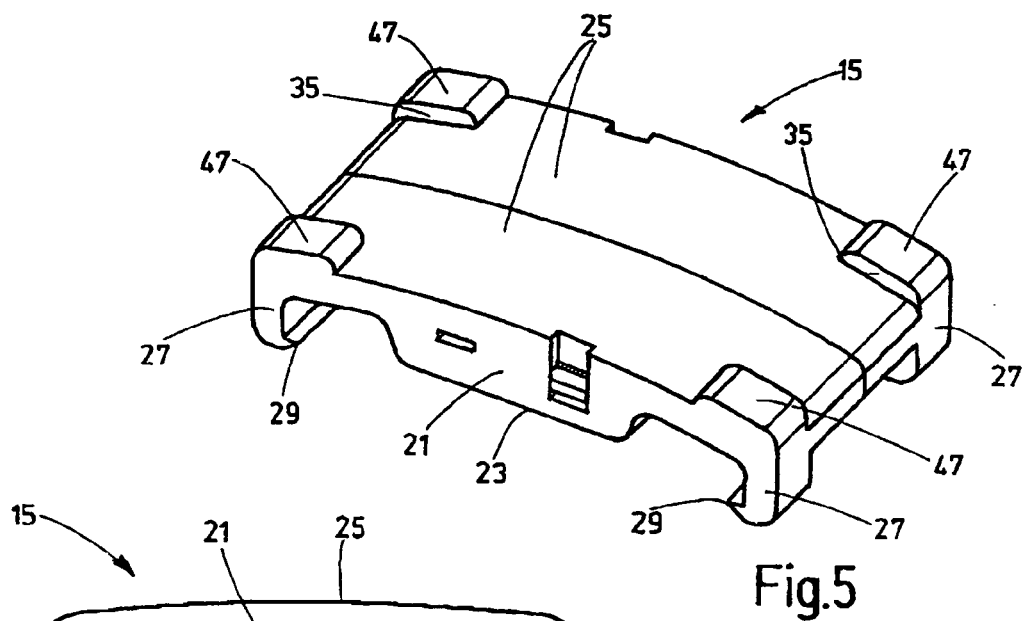
FIG. 5 is a perspective oblique view of a retaining body for the attachment system according to a second exemplary embodiment of FIG. 3.

The second exemplary embodiment shown in FIGS. 3, 5, and 6 differs from the first exemplary embodiment in that the connection between the trough-shaped bodies 11 is formed, not by lateral, axially outside wall parts 13, but by centrally positioned wall parts 41. Wall parts 41 at a radial distance from the opening of the trough-shaped bodies 11, so that the outer sides 43 on the opening edge of the trough-shaped bodies 11 are exposed. As FIG. 3 clearly shows, on these outer sides 43, catches 33 are provided for locking to the retaining bodies 15. In this exemplary embodiment, the retaining bodies 15, whose shape is detailed in FIGS. 5 and 6, with their fixing parts 27 above the edge of the wall parts 41 overlap the outer sides 43 of the trough-shaped bodies 11 for locking engagement of the catch projections 29 with the catches 33. As FIGS. 5 and 6 show, the retaining body 15 in this example is made in two parts from identical parts which can be locked to one another by catch strips 45.

In the absence of the axially outer wall parts 13 forming the guide of the tightening strap 17 in the first exemplary embodiment, the cover or outer surface 25 of each retaining bodies 15, shown separately in FIGS. 5 and 6, has radially protruding guide projections 47 for forming the lateral guide surfaces 35 for the tightening strap 17.

To prevent kinking of the tightening strap 17 between the succeeding trough-shaped bodies 11, bearing pieces 49 on the upper edge of the wall parts 41 are in the gap regions between succeeding trough-shaped bodies 11.

Figure 8:
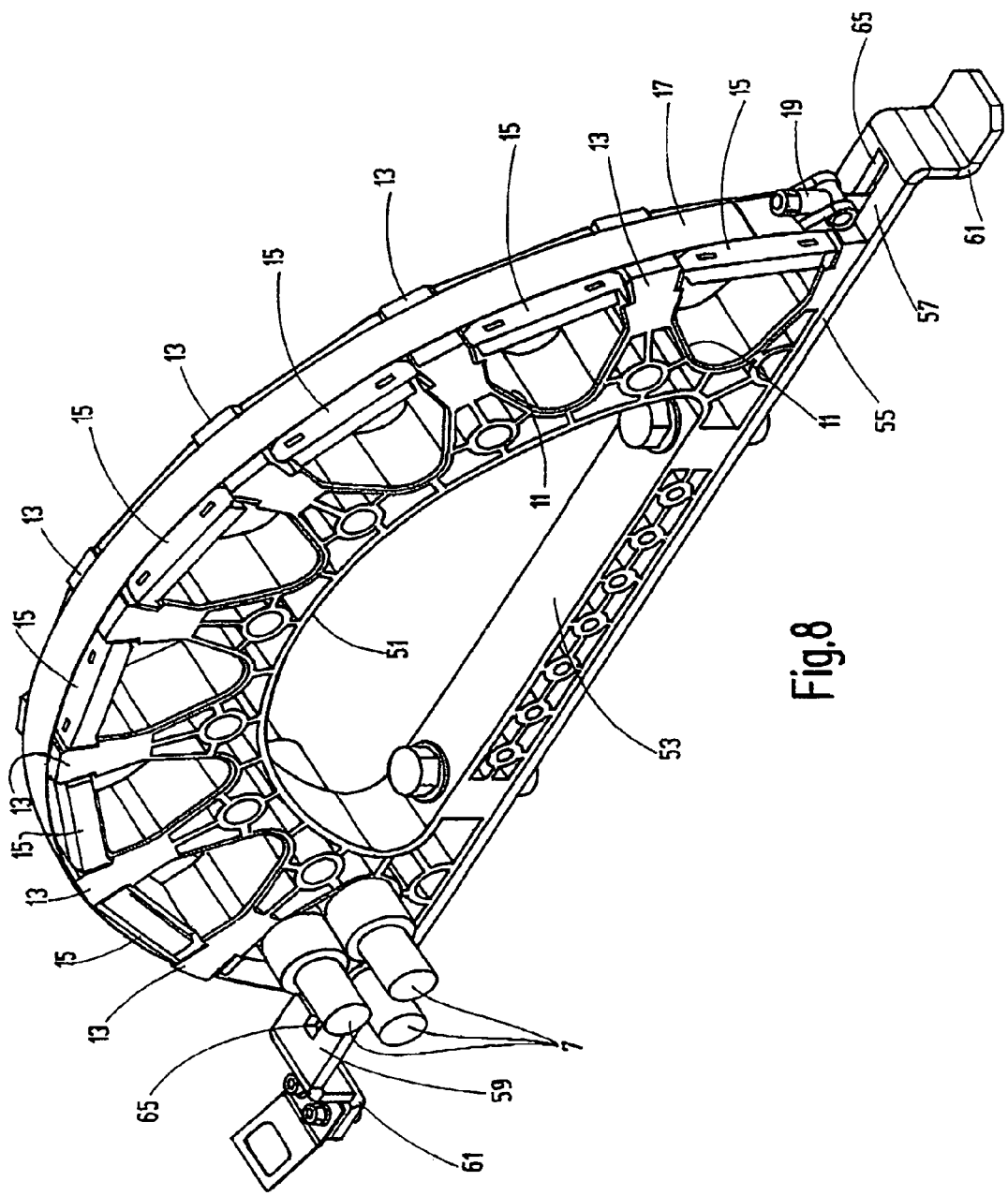
FIG. 8 is a perspective view of the attachment system of FIG. 7.
Figure 9:
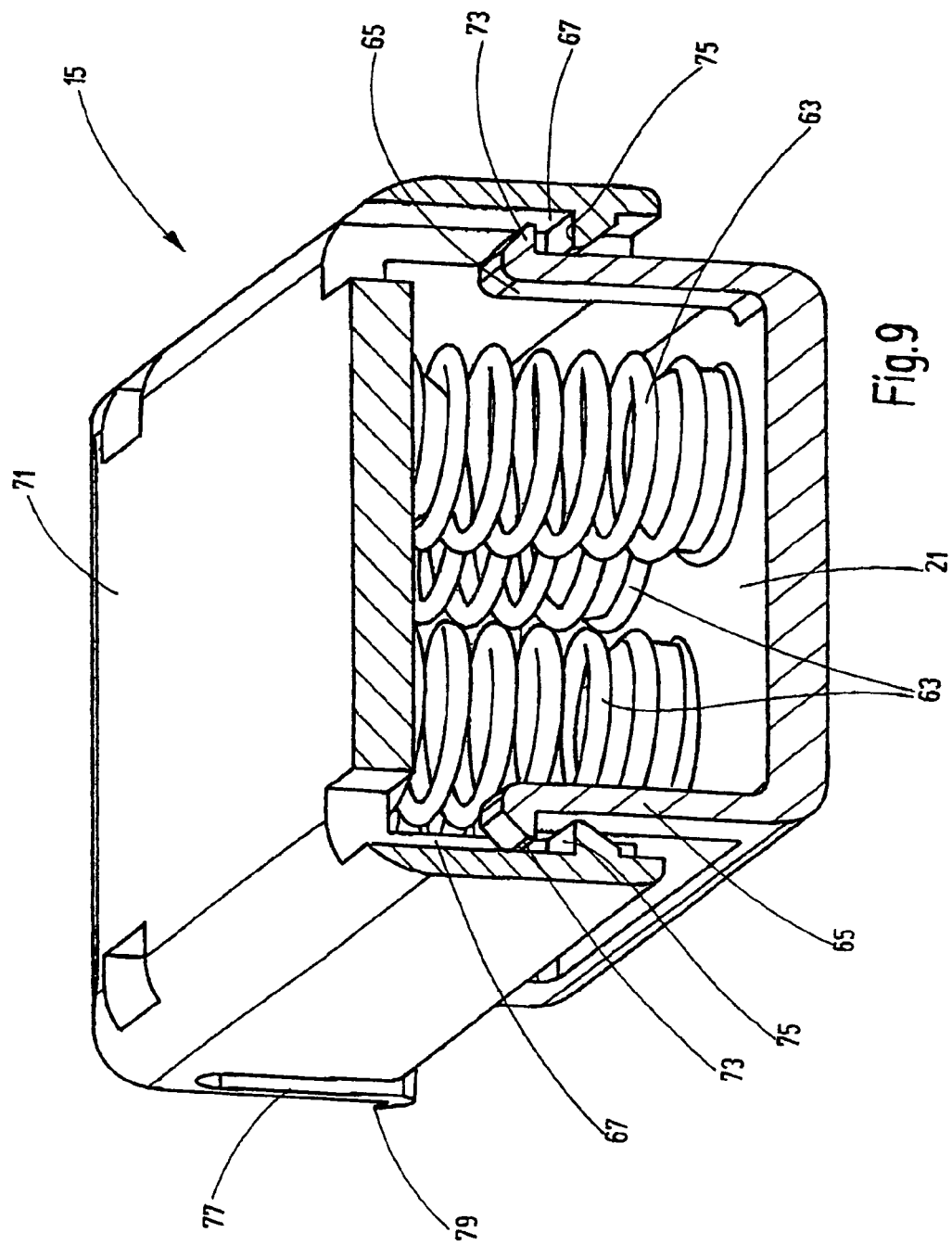
FIG. 9 is an enlarged, opened, perspective view of a retaining body for the attachment system according to the third exemplary embodiment of FIGS. 7 and 8.

The third exemplary embodiment shown in FIGS. 7 to 9 is especially well suited for attachment to a flat support structure. Instead of the base body 1 shown above forming a complete, closed, circular ring, in this exemplary embodiment a base body is in the form of a ring part 51 extending over only part of a circular line. The ends of the ring part 51 are connected by a crosspiece integral with the ring part 51 in the form of a straight beam 53. Beam 53 in turn is screwed to a bracket 55 in the form of a flat steel strip adjoining the underside of the beam 53 over the entire surface. The ends 57 and 59 of the bracket 55 extend beyond the ends of the ring part 51. Their respective end segments have an offset 61 for support and attachment to a support structure. In proximity to the offsets 61, the bracket 55 has longitudinal slots 65 used as anchor points for the tensioners 19 for the tightening strap 17 guided over the retaining parts 15 as in the other exemplary embodiments.

Another difference of the third exemplary compared to the first and second exemplary embodiments is that the clamping parts 21 of the retaining bodies 15 intended for clamping of the cables 7 are not located rigidly on the retaining bodies. These clamping parts 21 are movably guided in a spring housing 71 and are pretensioned by a spring assembly of several compression springs 63 in the direction to the cable 7 to be clamped. As FIG. 9 shows, the clamping part 21 has the shape of a rectangular plate. Corner regions guide strips 65 extend from that place into the spring housing 71 and are movably guided therein in guideways or guide 67. To limit the spring path and to prevent emergence of the clamping part 21 loaded by the spring assembly from the spring housing 71, stop projections 73 and 75 are on the guides 67 of the housing and the guide strips 65 of the clamping part 21. As in the above-described exemplary embodiments, the retaining bodies 15 can be secured on the ring part 51 forming the base body for preliminary fixing of the retaining bodies 15. For this purpose, the corner regions of the spring housing 71 have locking strips 77 corresponding to the fixing parts 27 of the above-described examples and form catch projections 79 correspond to the catch projections 29 of the above-described examples.

While various embodiments have been chosen to illustrate the invention, it will be understood by those skilled in the art that various changes and modifications can be made therein without departing from the scope of the invention as defined in the appended claims.

What is claimed is:

1. An attachment system for cables, comprising
a base body being one of securable to a support structure and fixed to a support structure;
cable bushings mounted on said base body, extending along at least a part of a ring of said base body and having outside openings therein for insertion cables in said cable bushings;
a curved outer part on said base body having two parallel wall parts between each pair of said cable bushings adjacent one another and delimiting axial outer sides of said curved outer part to define a strap groove opening radially outwardly between said wall parts; and
a cover closing said openings of said cable bushings, said cover having retaining bodies overlapping said cable bushings and having a tightening strap, recesses in one of said base body and said retaining bodies, and catch projections on the other of said base body and said retaining bodies, said recesses engaging said catch projections to lock said retaining bodies to said base body for preliminary attachment of cables in said cable bushings and to limit radially outward movement of said retaining bodies relative to said cable bushings, said tightening strap being in said strap groove, encompassing said base body and said retaining bodies and applying retaining forces on cables in said cable bushings via said retaining bodies.

2. An attachment system for cables, comprising
said base body has a circular ring shape with an inner ring attachable to a cylindrical support part and outer ring surrounding said inner ring at a radial distance thereto and supporting said cable bushings.

3. An attachment system according to claim 1 wherein
said base body comprises a ring part supporting said cable bushes and extends over a part of a circular line, ends of said base body being connected by a crosspiece integral with said base body, said crosspiece having a straight beam and being connected to a support bracket, said support bracket having bracket ends projecting over ends of said beam, said tightening strap having ends anchored to said bracket ends.

4. An attachment system according to claim 1 wherein
said cable bushings are trough-shaped bodies connected to adjacent ones thereof by wall parts extending in a peripheral direction of said base body.

5. An attachment system according to claim 1 wherein
said retaining bodies have clamping parts projecting into said openings of said cable bushings in operating positions thereof and having contact surfaces applying the retaining forces on the cables.

6. An attachment system according to claim 5 wherein
said retaining bodies have cover surfaces opposite said contact surfaces thereof forming bearings for said tightening strap, said contact surfaces having arches matched to a peripheral circular line of said base body.

7. An attachment system according to claim 1 wherein
said base body has a circular ring shape with an inner ring attachable to a cylindrical support part and outer ring surrounding said inner ring at a radial distance thereto and supporting said cable bushings;
said recesses are radially open to an outside of said base body and are located on both sides of each said cable bushing, said catch projections being on said retaining bodies, said recesses having catches engaging said catch projections.

8. An attachment system according to claim 7 wherein
said retaining bodies have clamping parts projecting into said openings of said cable bushings in operating positions thereof and having contact surfaces applying the retaining forces on the cables;
said retaining bodies have cover surfaces opposite said contact surfaces thereof forming bearings for said tightening strap, said contact surfaces having arches matched to a peripheral circular line of said base body; and
said wall parts on both sides of each said cover surface have guide surfaces for laterally guiding said tightening strap therebetween.

9. An attachment system according to claim 1 wherein
catches are on outer sides of said cable bushings, said outer sides being overlapped by parts of said retaining bodies; and
said catch projections are on said retaining bodies and engage said catches.

10. An attachment system according to claim 1 wherein
said retaining bodies have cover surfaces facing radially outwardly and having radially protruding guide projections forming guide surfaces for laterally guiding said tightening strap therebetween.

11. An attachment system according to claim 1 wherein
each said retaining body comprises a pair of identical parts connect to one another, each said identical part having a protruding guide projection with guide surfaces engaging sides of the tightening strap.

12. An attachment system according to claim 1 wherein
each said retaining body comprises a spring housing receiving a clamping part with a contact surface to engage a cable in the respective cable bushing, each said clamping part being movably guided in the respective spring housing and pretensioned by a spring toward the cable clamped thereby.

13. An attachment system according to claim 1 wherein cables of a wind turbine are received in said cable bushings.

14. An attachment system according to claim 1 wherein
said tightening strap is a single member with a tensioner connecting the ends thereof.

15. An attachment system according to claim 1 wherein
said tightening strap is a single member with tensioners at opposite ends thereof.

* * * * *